United States Patent [19]
Winkel

[11] Patent Number: 6,151,709
[45] Date of Patent: *Nov. 21, 2000

[54] PROCESSES AND APPARATUSES FOR UPLOADING INSTRUCTIONS TO A COMPUTER

[75] Inventor: Jerry Curtis Winkel, Lindon, Utah

[73] Assignee: Novell, Inc., Provo, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 09/023,822

[22] Filed: Feb. 13, 1998

[51] Int. Cl.[7] .................................................. G06F 9/445

[52] U.S. Cl. .............................................................. 717/11

[58] Field of Search .................................. 395/712, 700; 717/11

[56] References Cited

U.S. PATENT DOCUMENTS

| | | | |
|---|---|---|---|
| 4,954,941 | 9/1990 | Redman | 717/11 |
| 5,155,847 | 10/1992 | Kirouac et al. | 709/221 |
| 5,212,789 | 5/1993 | Rago | 707/8 |
| 5,274,808 | 12/1993 | Miyao et al. | 717/11 |
| 5,297,285 | 3/1994 | Abrahamsson et al. | 709/33 |
| 5,339,430 | 8/1994 | Lundin et al. | 709/332 |
| 5,410,703 | 4/1995 | Nilsson et al. | 717/11 |
| 5,555,418 | 9/1996 | Nilsson et al. | 717/11 |
| 5,560,005 | 9/1996 | Hoover et al. | 707/10 |
| 5,687,363 | 11/1997 | Oulid-Aissa et al. | 707/4 |
| 5,694,596 | 12/1997 | Campbell | 707/10 |
| 5,708,809 | 1/1998 | Leimkoetter | 717/4 |
| 5,946,698 | 8/1999 | Lomet | 707/202 |
| 6,018,629 | 1/2000 | Tojima | 717/11 |
| 6,018,747 | 1/2000 | Burns et al. | 717/11 |

OTHER PUBLICATIONS

Zygmont, A.; "Developing an Expert System to Diagnose Computer Program Outputs". IEEE/IEE Electronic Library [online], IEEE Conference on Developing and Managing Intelligent System Projects, pp. 139–145, Mar. 1993.

Smith, D.; "The ACT (Automatic Computer Troubleshooting) Project". IEEE/IEE Electronic Library[online], The 22nd Southeastern Symposium on System Theory, pp. 389–393, Mar. 1990.

IBM Corporation; "Method to Finally 'Commit' a Set of Recently Applied Software Updates". IBM Technical Disclosure Bulletin, pp. 5063–5064, Apr. 1987.

IBM Corporation; "Method for Controlling Test Execution in a Build–to–Order Test Environment". IBM Technical Disclosure Bulletin, pp. 67–68, Dec. 1993.

Teach Yourself Java in 21 Days, Professional Reference Edition, Nov. 1996 by Sams.net Publishing, *Java Applet Basics, Week 2*, pp. 157–180.

World Wide Web document, (URL: http:www.pointcast-.com/whatis.html?home), printed Jan. 29, 1998, *The Point-Cast Network*, publication date unknown, (2 pages).

Peter van der Linden, *Just Java* Second Edition, The Sun-Soft Press, Java Series, 1997 Sun Microsystems, Inc., (4 pages).

*Primary Examiner*—Tariq R. Hafiz
*Assistant Examiner*—Kelvin Booker
*Attorney, Agent, or Firm*—Cesari & McKenna

[57] ABSTRACT

A process for transferring a set of instructions between a first computer system and a second computer system is provided, wherein the second computer system includes working memory and a computer application. The process comprises the steps of executing the computer application at the second computer system, establishing communication between the first computer system and the second computer system, transferring a first set of instructions from the first computer system to the second computer system, and loading the first set of instructions into the working memory of the second computer when the computer application is in a partially executed state. The computer application initiates execution of at least a portion of the first set of instructions.

21 Claims, 6 Drawing Sheets

PROCESSES AND APPARATUSES FOR UPLOADING INSTRUCTIONS TO A COMPUTER

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD OF THE INVENTION

This invention relates generally to the field of processes and apparatuses for uploading a set of instructions to a computer, and, more particularly, to processes and apparatuses for uploading a set of instructions to a server computer which replace or add to existing functions of a computer application at the server computer and which are dynamically executed by the server computer.

BACKGROUND OF THE INVENTION

As the complexity and pervasiveness of computer systems and their software has grown, so too has the need for their technical support. Troubleshooting of computer system and software problems generally requires the remote execution of computer programs or instructions on a customer's computer to diagnose or locate the source of the problem. For example, the instructions might be used to locate and correct the source of corruption in a database. While the use of computer programs to diagnose system and software problems is common place, there are many obstacles to efficient implementation of these diagnostic programs. For example, the diagnostic program must be transferred to the remote computer and sometimes may need to be customized thereat in order to address the specific problems at the remote computer. In addition, operation of the diagnostic program and interpretation of any output therefrom may require a level of skill in the art greater than at the customer's disposal. Still further, security concerns and the protection of trade secret information may necessitate deletion of the diagnostic program after it is no longer needed.

Often times, the above-described considerations necessitate a customer support representative or developer traveling to the remote location of the computer system or software problem to load and execute the diagnostic computer program. This procedure, however, is often expensive, inefficient and time consuming. As such, there is a continuing need for apparatuses and processes for providing efficient and cost effective remote diagnosis and repair of computer system and software problems. Still further, there is a continuing need to provide processes and apparatuses for the intelligent monitoring and product support of a computer system, wherein a computer application would be automatically monitored and upgraded as needed.

SUMMARY OF THE INVENTION

Accordingly, it is an object of the present invention to obviate the above-described shortcomings of remote diagnosis of computer systems and software.

It is another object of the present invention to provide processes and apparatuses for uploading instructions to a remote computer for dynamic execution thereat.

It is still another object of the present invention to provide processes and apparatuses for uploading a set of instructions into the working memory of a remote computer for dynamic execution by a computer application.

It is yet another object of the present invention to provide processes and apparatuses for dynamically modifying a computer application.

In accordance with one aspect of the present invention, a process for transferring a set of instructions between a first computer system and a second computer system is provided, wherein the second computer system includes working memory and a computer application. The process comprises the steps of executing the computer application at the second computer system, establishing communication between the first computer system and the second computer system, transferring a first set of instructions from the first computer system to the second computer system, and loading the second set of instructions into the working memory of the second computer when the computer application is in a partially executed state. Preferably, the first set of instructions comprises a second set of instructions for interacting with the computer application, execution of the second set of instructions being initiated by the computer application. This interaction can comprise extracting information from the second computer system, modifying data stored in a database, disabling a function of the computer application, or adding a new function to the computer application. Preferably, the step of establishing communication further comprises the step of establish a network connection between the first computer system and the second computer system. The first computer can be provided in the form of a client computer and the second computer can be provided in the form of a server computer while the working memory can be provided in the form of random access memory.

BRIEF DESCRIPTION OF THE DRAWINGS

While the specification concludes with claims particularly pointing out and distinctly claiming the invention, it is believed the same will better understood from the following description taken in conjunction with the accompanying drawings in which:

DETAILED DESCRIPTION OF THE PREFERRED EMBODIMENTS

Reference will now be made in detail to the preferred embodiments of the present invention, examples of which are illustrated in the accompanying drawings wherein like numerals indicate the same elements throughout the views, and wherein numerals having the same last two digits (e.g., 20, 120) connote corresponding structures between the embodiments. As will be understood hereafter, the preferred embodiments of the present invention relate to processes and apparatuses for uploading a set of instructions into the working memory of a remote computer for execution thereat, wherein the set of instructions comprises computer code which replaces or supplements the original computer code for one or more functions of an existing computer application disposed at the remote computer. More preferably, execution of the replacement or supplemental computer code is initiated by the computer application when the computer application is already in a partially executed state (i.e., after the computer application is resident or loaded at the remote computer, such as would be the case with a TSR program). Most preferably, the present invention is adapted to upload a set of instructions from a client computer to a server computer to facilitate the diagnosis and/or repair of computer system or software problems at the server computer and the set of instructions is further adapted to send information to the client computer to aid in the diagnosis, repair or updating process.

As is known in the art, computers often communicate between each other and share information, applications and/or services. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client computers tend to run client software and have a client operating system disposed thereon while server computers tend to run server software and have a server network operating system disposed thereon, however a server can be a client as well and some operating systems can operate on either a client or a server. The client/server architecture is most often utilized in database applications where the client computer provides the user interface and various functions while the server computer handles data storage and retrieval, including sorts, indexes and queries. The client/server architecture is also suitable for applications such as electronic messaging, document management, backup, directory services and the like.

Figure 1:
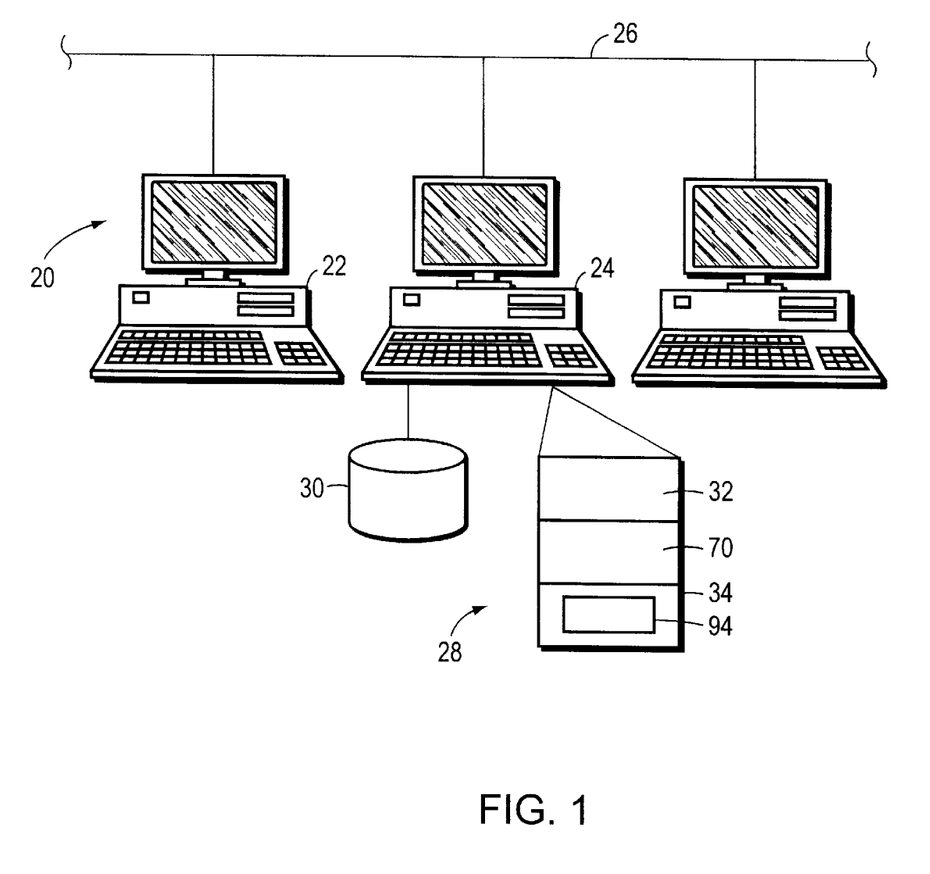
FIG. 1 is a schematic illustration of a computer system suitable for use with the present invention.

FIG. 1 illustrates an exemplary client/server computer network 20 which is suitable for use with the present invention. A first computer 22 and a second computer 24 are interconnected by a physical network 26, wherein the first computer 22 is preferably provided in the form of client computer and the second computer 24 is provided in the form of a server computer. However, as one with ordinary skill in the art will readily appreciate, a client/server network is only one type of network which is suitable for use with the present invention, and a variety of other configurations, such as peer-to-peer connections can also be provided. The physical network 26 can be provided in the form of a token ring, Ethernet, telephone modem connection, radio or microwave connection, or the like.

A computer readable medium, shown in connection with the second computer 24 as Random Access Memory 28 (or RAM), holds information readable by a computer, such as programs, data, files, etc. As is known in the art, RAM is the working memory of a computer and at least portions of a computer program or application are loaded into RAM from other forms of computer readable medium, such as a hard disk drive 30, when the computer program is run. Other forms of working memory can include a cache, hard disk RAM, and the like. It will further be readily appreciated that a computer readable medium can take a variety of other forms, including other types of magnetic storage (such as floppy diskettes, etc.), optical storage (such as laser discs, compact discs, etc.), electronic storage (such as read only memory "ROM", programmable read only memory "PROM", etc.), and the like. Certain types of computer readable medium, which are sometimes described as being nonvolatile, can retain data in the absence of power so that the information is available when power is restored while a volatile computer readable medium will retain data only so long as power is applied thereto. Preferably, the computer readable medium 28 is divided into at least a buffer 32 and allocated memory 34, the purposes of which are described more fully hereafter.

Figure 2:
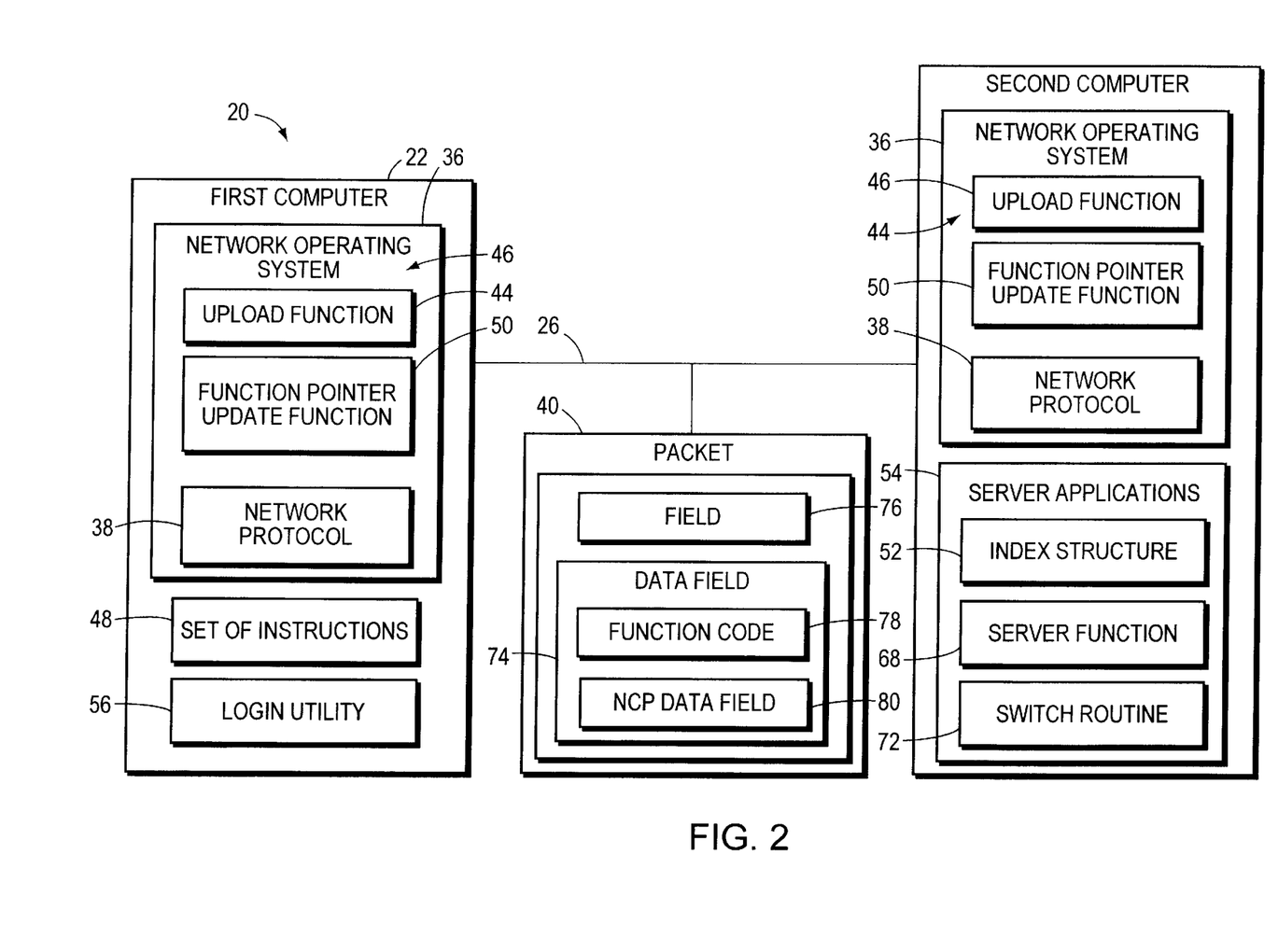
FIG. 2 is a schematic illustration of preferred embodiments of the first and second computers of FIG. 1.

Referring now to FIG. 2, the first and second computers 22 and 24 will be described in greater detail. The first and second computers 22 and 24 preferably have an operating system 36 disposed thereon for facilitating communication between the first and second computers across the physical network 26, although this communications process can be implemented by a separate application if necessary (e.g., NOVELL CLIENT 32, NOVELL NETX, and NOVELL VLM). The operating system 36 implements the protocols and functions necessary for transmitting and receiving data across the physical network 26 and preferably comprises a network protocol 38 which is responsible for the routing of packets 40 of information across the physical network 26 and one or more specialized network functions 44. For example, a network function 44 might include the instructions necessary for opening or closing a file located at the second computer 24. In accordance with one aspect of the present invention, the specialized network functions 44 include an upload function 46 for copying a set of instructions 48 transmitted from the first computer 22 to the second computer 24 into the second computer's computer readable medium, preferably RAM 28, and a function pointer update function 50 for updating an index structure 52 of a server application 54 disposed at the second computer 24, as described more fully hereafter. Most preferably, the operating system 36 is provided in the form of NOVELL NETWARE® which comprises the Internet Packet Exchange (IPX) protocol and NETWARE® CORE PROTOCOL (NCP). While the present invention will be described hereafter with respect to the IPX and NCP protocols, it is understood that other protocols and operating systems can be adapted for use with the present invention. For example, MICROSOFT WINDOWS NT® or one of a wide variety of UNIX(® operating systems can be equally suitable.

The first computer 22 also has a login utility 56 disposed thereat for accessing the second computer 24 and for facilitating the transmission of the set of instructions 48 (commonly referred to as a "patch") from the first computer 22 to the second computer 24. The set of instructions 48 can be provided in the form of processor native code (i.e., executable code), compiled code (i.e., object code) or as source code. If the set of instructions 48 is provide in the form of source code, the set of instructions 48 would have to be compiled at the second computer 24 prior to its execution.

Figure 3:
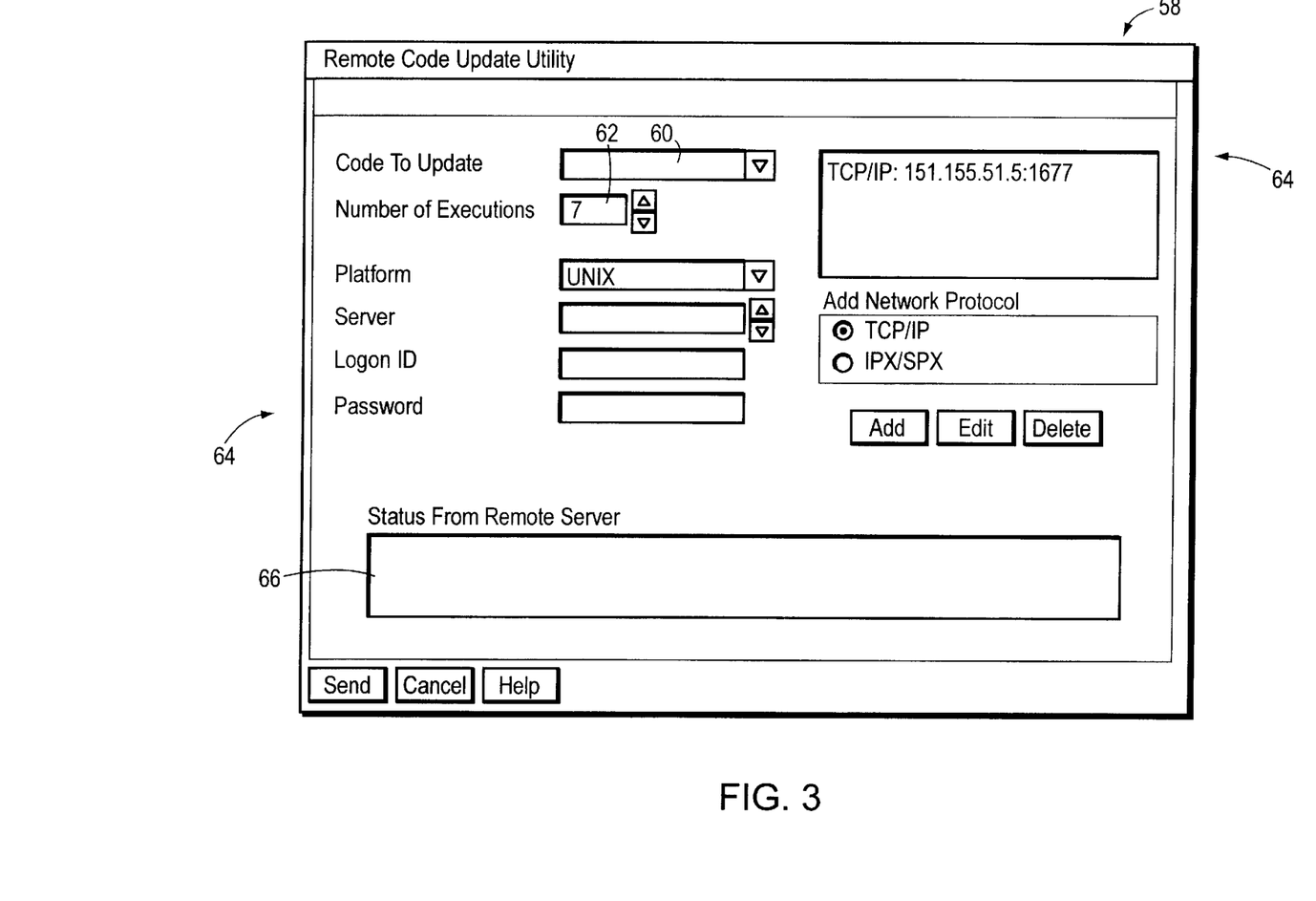
FIG. 3 is a graphical illustration of an exemplary user interface made in accordance with the present invention for facilitating transfer of a set of instructions between the first and second computers of FIG. 1.

The login utility 56 is preferably capable of displaying a graphical user interface on a display device of the first computer 22 which is accessed by a user of the first computer 22. An exemplary user interface 58 is illustrated in FIG. 3 and preferably comprises a code field 60 for user selection of the set of instructions 48 which are to be transferred to the second computer 24 and an execution field 62 for user input of the number of times the set of instructions 48 will be executed at the second computer 24. One or more network connection fields 64 can be provided for user input of information to facilitate establishing a network connection between the first computer 22 and the second computer 24. Exemplary connection fields, which are illustrated in FIG. 3, could include a field for designating the type of operating system disposed on the second computer 24, the network address of the second computer 24, the login identification and password required to access the second computer 24, the network protocol 38 (e.g., TCP/IP, IPX/SPX, etc.) to use for establishing the network connection, and the like. The user interface 58 also preferably includes a status field 66 for displaying messages from the second computer 24 during and/or after the execution of the set of instructions 48 at the second computer 24.

Referring back to FIG. 2, the second computer 24 has the server application 54 disposed thereon. Typical server applications can include a database application, an electronic messaging/mail application (e.g., GROUPWISE® by NOVELL®, Inc.). a directory service application (e.g., NETWARE® DIRECTORY SERVICES by NOVELL®, Inc.) or the like. The server application 54 also comprises one or more of server functions 68 which are executable by the second computer 24 and the indexing structure 52 which correlates each server function 68 with its memory location 70 (FIG. 1)in the second computer's RAM 28. As is known in the art, when a computer program (such as the server application 54 ) is run, portions of the code associated with the computer program are loaded into the computer's RAM with each server function 68 occupying a specific memory location in the computer's RAM. When a server function 68 is called, a pointer automatically directs execution to the location in the second computer's memory where the code for this server function 68 is located. Typically, the code for the server functions 68 is closely spaced in the RAM 28 of the second computer 24 when the server application 54 is loaded. As such, replacing or modifying the code for a server function 68 without recompiling the server application 54 is difficult if the replacement code occupies more memory, as is often the case, than the original code for that server function.

In a preferred form of the present invention, however, the index structure globally stores a reference, such as a pointer, to the memory location 70 in the RAM 28 where the computer code for one or more server functions 68 is located. When a server function 68 is called by the server application 54, the index structure 52 is first searched to determine the memory location 70 of the server function 68 which is called, and, based upon the function pointer stored in index structure 52, execution then passes to that memory location. Because the index structure 52 can be easily modified (i.e., the pointers therein changed), the index structure 52 provides a level of indirection between a call to a server function 68 and the executable code for that server function 68 so that the code for one or more server functions 68 can be dynamically modified, without regard to whether the modified code requires more memory than that of the original unmodified server function 68. The index structure 52 is preferably provided in the form of an array, although other constructs or arrangements can be equally suitable.

The server application 54 also preferably comprises a switch routine 72 for permitting a user of the second computer 24 to disable any server application processes which might interfere with the execution of the set of instructions 48 which will be uploaded to the second computer 24 from the first computer 22. For example, the switch routine 72 might disable spontaneous database checking, indexing, or the like.

Data, such as the set of instructions 48, is preferably exchanged between the first and second computers 22 and 24 across the physical network 26 in a formatted form often referred to as a packet 40. The network protocol 38 is responsible for formatting the data into a packet 40. For example, an IPX packet 40, which is illustrated in FIG. 2, contains a data field 74 having a function code 78 and an NCP data field 80. The function code 78 is associated with and identifies a specific network function 44 and thereby instructs the second computer 24 to execute the specific network function 44 associated with the function code 78 when the packet is received at the second computer 24. For example, the network function 44 for opening a file would have a different function code 78 associated therewith than the function code 78 associated with the network function for closing a file. As such, it will also be understood that the upload function 46 and function pointer update function 50 will each have an unique function code 78 associated therewith. One or more other fields 76 for storing information such as the length of the packet, the destination network, the destination host, etc. can also be provided.

Figure 4:
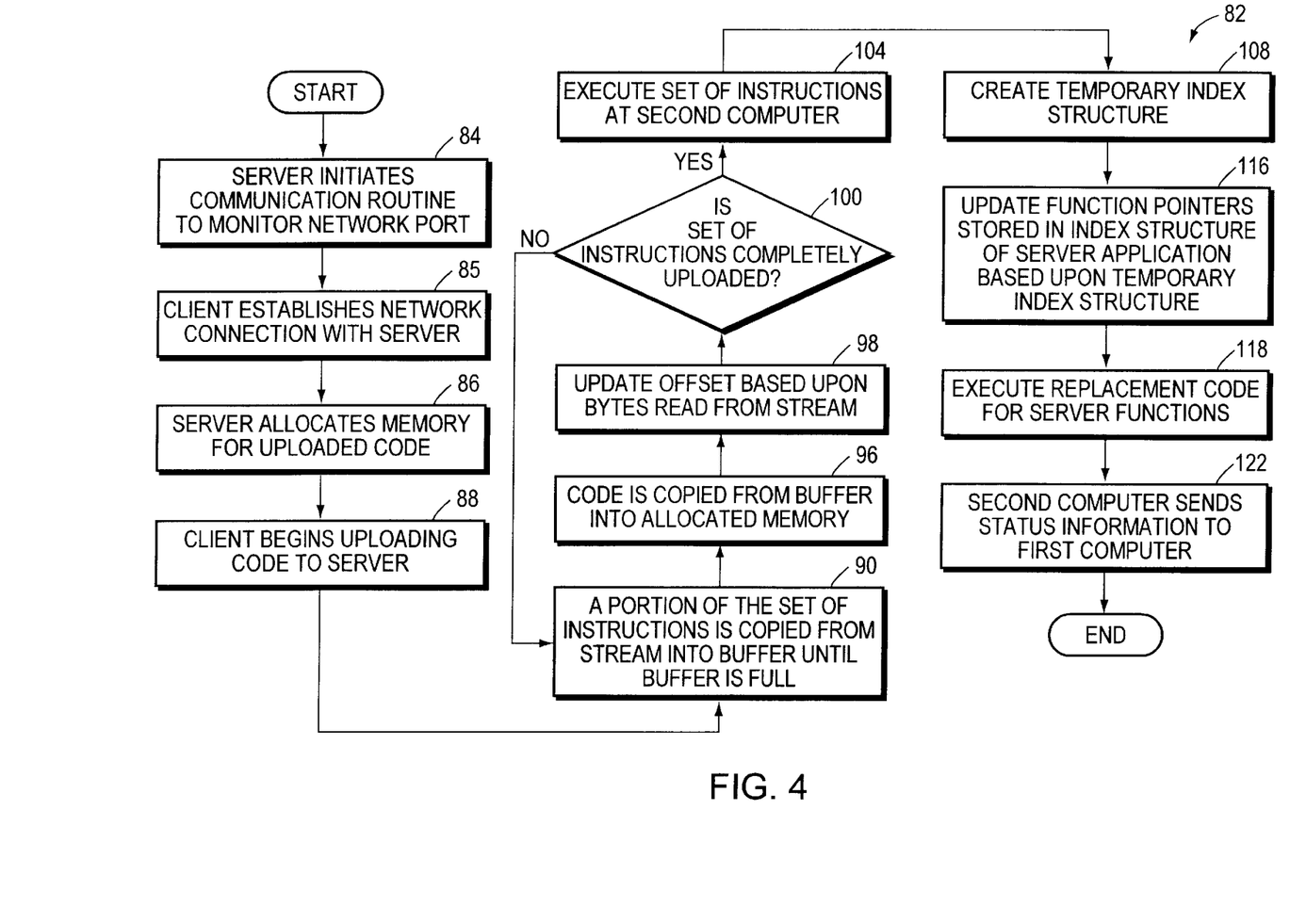
FIG. 4 is a schematic illustration of a preferred process made according to the present invention for uploading a set of instructions between the first and second computers of FIG. 1.
Figure 5:
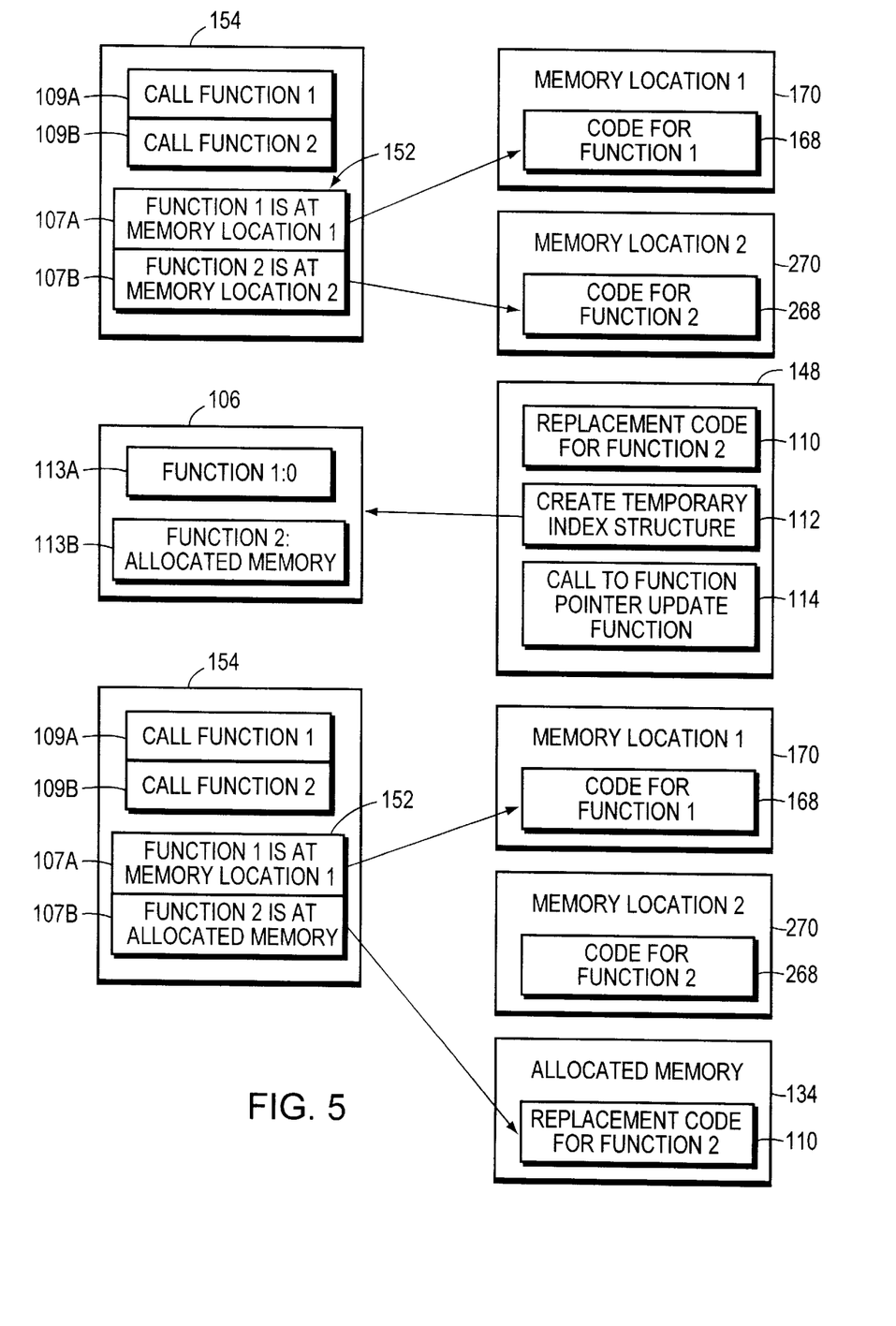
FIG. 5 is a schematic illustration of an exemplary set of instructions and server application made in accordance with the present invention and suitable for use with the computer system of FIG. 1.

Referring to FIGS. 2, 4 and 5 and in accordance with another aspect of the present invention, an exemplary process 82 for uploading and executing the set of instructions 48 at the second computer 24 will now be described in the context of diagnosing or fixing a problem with the server application 54 disposed at the second computer 24. A user of the second computer 24, such as a system administrator, upon encountering a problem (such as data corruption, a conflict, or other reportable error) with the server application 54 contacts the user of the first computer 22, who may be, for example, the developer of or a technical support person for the server application 54, to advise this person of the problem. The user of the second computer 24 then re-initiates execution of the server application 54 and, through the use of a switch or other input, triggers execution of the switch routine 72 to ready the server application 54 for the uploading of the set of instructions 48 into the second computer's RAM 28. The switch routine 72 preferably disables any server functions 68 or other processes (e.g., threads, tasks, etc.) of the server application 54 which could interfere with execution of the set of instructions 48. The switch routine 72 also preferably spawns or initiates a separate thread or task for monitoring the communication port of the second computer 24 for a packet 40 from the first computer 22 for establishing a network connection there between, as shown in block 84 of FIG. 4.

After the initial network connection is established between the first computer 22 and the second computer 24 as described in block 85, the user of the first computer 22 logs into the second computer 24 using the login utility 56. The login utility 56 transmits such information as the user's name and password to the second computer 24, this information having been input through the user interface 58 (FIG. 3), as previously described. During this login process, the first computer 22 and the second computer 24 will exchange additional packets 40, commonly referred to as handshaking, which will establish the appropriate network connection parameters between the first computer 22 and the second computer 24 (e.g., maximum packet size, connection number, etc.).

After the login process is complete, the first computer 22 transmits a plurality of packets 40 to the second computer 24 which contain the set of instructions 48 as well as any desired additional information, such as the number of execution cycles input through the execution field 62 of the user interface 58. At least one of these packets 40 also preferably contains the function code 78 which instructs the second computer 24 to execute the upload function 46 of the operating system 36 at the second computer 24.

Referring now to FIGS. 4 and Tables 1 and 2 and in accordance with another aspect of the present invention, an exemplary upload function 46 of the present invention will now be described, wherein Tables 1 and 2 contain exemplary code describing various aspects of the upload function 46. As previously described, the packets 40 contain a function code 78 which instructs the second computer 24 to execute the upload function 46. As described in Table 1 and block 86, execution of the upload function 46 allocates the memory 34 (FIG. 1) of the second computer's RAM 28 for storing the set of instructions 48 which are transmitted from the first computer 22 to the second computer 24. As the packets 40 containing portions of the set of instructions 48 arrive at the second computer 24, as described in block 88, the portions of the set of instructions 48 contained in the NCP data field 80 of each packet 40 are read from the stream and copied into the buffer 32 (FIG. 1) of the RAM 28 until the buffer 32 is full, as indicated in block 90. As is known in the art, the buffer 32 is a portion of the second computer's RAM 28 which is used for temporary storage of data between two data handling systems having different access times or data formats. When the buffer 32 is full, the portions of the set of instructions 48 which are stored therein are copied into an open memory location 94 of the second computer's allocated memory 34 in block 96. After the contents of the buffer 32 have been copied into the allocated memory 34, an offset variable (e.g., totalBytesRead in Table 1) is updated as indicated in block 98 to reflect the total number of bytes which have been read from the stream. This is useful for properly copying the portions of the set of instruction 48 into the allocated memory 34 so that the next portion of the set of instructions 48 can be sequentially placed into the allocated memory 34.

TABLE 1

```
Server::UploadFunction(STREAM stream)
{
    patch = new char[stream.Size()];
    if(patch)
    {
        char localBuffer[BUFFER_SIZE];
        int totalBytesRead = 0;
        while (!buffer.EOF())
        {
            int bytesRead;
            stream.ReadData(BUFFER_SIZE,//requested size to read
                    &bytesRead);//actual bytes read <= BUFFER_SIZE
            if(bytesRead != 0)
            {
                Copy(patch + totalBytesRead,//destination
                    localBuffer,         //source
                    bytesRead);         // # bytes to copy
                totalBytesRead += bytesRead;
            }
        }
        Server::executePatch()
    }
    else
    {
        //"insufficient memory" exception
    }
}
```

As indicated in block 100, the process of copying the set of instructions 48 into the buffer 32 from the stream and then into the allocated memory 34 continues until the entire set of instructions 48 has been copied into the allocated memory 34. The set of instructions is next executed, as described in block 104 and Table 1 above, the execution being initiated by the upload function 50 (e.g., Server::ExecutePatch 0). Execution of the set of instructions 48 preferably creates a temporary index structure in block 108 (e.g., the array MAX_PATCHABLE_FUNCTIONS of Table 2), this temporary index structure being illustrated, by way of example, in FIG. 5 as element 106. The temporary index structure 106, which can be provided in the form of an array, stores references, such as pointers, which are associated with the memory locations 94 of the allocated memory 34 storing the uploaded set of instructions 48. More particularly, the references are associated with those memory locations 94 where the portions of the set of instructions 48 are located which replace or modify the computer code for one or more server functions 68. If a server function 68 is not replaced by new code uploaded with the set of instructions 48, a zero is preferably inserted into the temporary index structure 106 to indicate the same.

For example, FIG. 5 illustrates an exemplary server application 154 which has been loaded into the memory of second computer 24. The server application 154 comprises a Function 1 and a Function 2, the computer code (or set of function instructions) for which have been loaded into RAM memory locations 170 and 270, respectively. The server application 154 also comprises an index structure 152 in the form of an array containing array members 107 A and 107 B storing pointers to the memory locations 170 and 270. Thus, upon executing the call 109 A to Function 1 of the server application 154, the index structure 152 is searched to determine the RAM memory location (e.g., 170 ) storing the computer code for Function 1, with execution next jumping to that memory location.

An exemplary set of instructions 148 is also illustrated in FIG. 5 which can be uploaded from the first computer 22 to the second computer 24. The set of instructions 148 comprises replacement computer code 110 for Function 2 as well as computer code 112 for creating the temporary index structure 106 in the form of an array having array members 113A and 113B. The set of instructions 148 also comprises a call 114 to the function pointer update function 50 of the operating system 36. As shown, the temporary index structure 106 indicates that replacement computer code for Function 2 has been uploaded with the set of instructions 148 and loaded into the allocated memory 134 but that no replacement code for Function 1 has been uploaded (i.e., array member 113A of the temporary index structure 106 contains a zero).

Referring again to FIG. 4, after the temporary index structure (e.g., 106) has been created in block 108, execution of the set of instructions next calls the function pointer update function 50, which is part of the operating system 36. The function pointer update function 50 copies the function pointers stored in the temporary index structure 106 created in block 116 into the index structure (e.g., 52) of the server application 54 (which is searched each time a server function is called by the server application 54). This updating is described in block 116 of FIG. 4 and in Table 2 below.

TABLE 2

```
//Server routine that replaces function pointer(s), causing function to execute
//patch code instead of existing server code. This code assumes a level of
//indirection between the caller and the function code.
Server::FunctionPointerUpdate(FUNCTION *
        oldFunction[MAX_PATCHABLE_FUNCTIONS])
{
  //Wait until the server is in a safe state for the update
  Quiesce();
  int functionCtr;
  for(functionCtr = 0; functionCtr < MAX_PATCHABLE_FUNCTIONS
      && oldFunction[functionCtr]; functionCtr++)
  {
    if(functionPtr[function Ctr])
      oldFunction[functionCtr] = functionPtr[functionCtr];
  }
}
```

As will be apparent, the replacement of one or more pointers in the index structure 52 will cause execution of those portions of the computer code which were uploaded with the set of instructions 48 and which are associated with the new pointer when the appropriate server function 68 is called, as described in block 118. In this manner, the original computer code for one or more predetermined server functions 68 can be bypassed or effectively replaced by new computer code which has been uploaded with the set of instructions 48. Preferably, the index structure 52 is updated by the function pointer update function 50 after the second computer 24 is in a safe state so that the updating of the function pointers occurs at a time when execution of the server application 54 (or any another application being dynamically executed at the second computer 24) will not be damaged by the update. After or during execution of the set of instructions 48, the second computer 24 can be instructed to send status messages or other information back to the first computer 22 to aid in troubleshooting the problems at the first computer 22. For example, portions of a database or the test results from the execution of an uploaded function might be sent.

Referring again to FIG. 5, the above-described process is illustrated by way of example with respect to the set of instructions 148. Particularly, execution of the function pointer update function 50 will update the index structure 152 of the server application 154 so that execution of the call 109B to Function 2, which results in a search of the index structure 152, will cause the replacement code 110 for Function 2 stored in the allocated memory 134 to be executed rather than the original code 268 for Function 2 which is stored in memory location 270.

Figure 6:
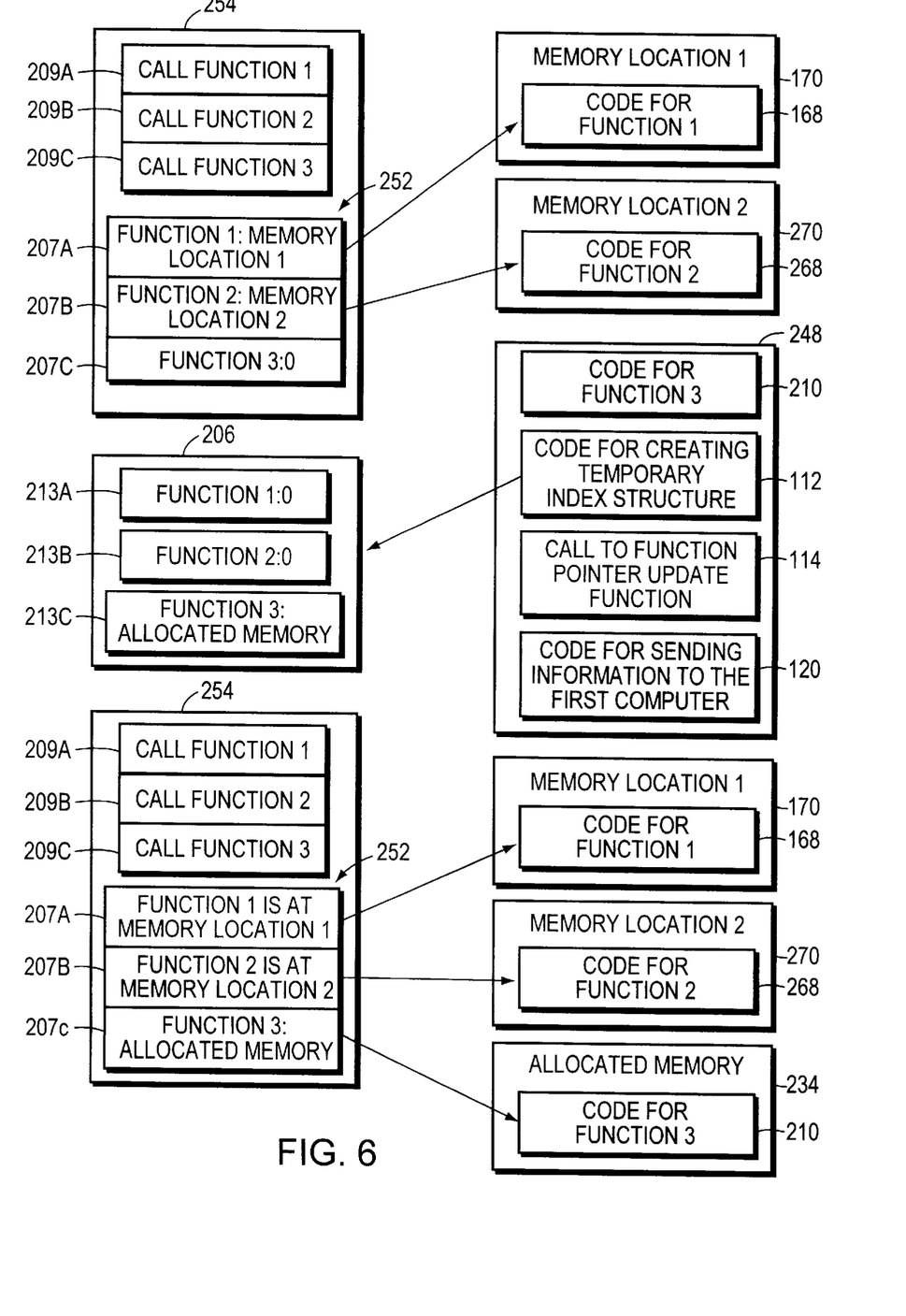
FIG. 6 is a schematic illustration of another exemplary set of instructions and server application made in accordance with the present invention and suitable for use with the computer system of FIG. 1.

In another preferred embodiment of the present invention, an index structure initially comprises a plurality of null members or elements for storing future references or pointers to server functions which will be later uploaded in a set of instructions so that the server application can be provided with new functions without replacing any existing server functions. For example, as illustrated in FIG. 6, a server application 254 comprises a call 209A to a Function 1, a call 209B to a Function 2, and a call 209C to a Function 3. The computer code 168 and 268 for Function 1 and Function 2 are stored at memory locations 170 and 270, respectively, when the server application 254 is loaded or is resident at the second computer. As will be apparent, the server application 254 does not initially have any computer code or instructions for the Function 3, as indicated by the zero stored in the array member 207C of the index structure 252 (the elements 207A and 207B comprising pointers to the memory locations 170 and 270 as shown).

An exemplary set of instructions 248 which can be uploaded from the first computer 22 to the second computer 24 (FIG. 1) is also illustrated in FIG. 6 and comprises the code 210 for the Function 3, the code 210 for creating the temporary index structure 206, the call 114 to the function pointer update function 50, and the code 120 for implementing the transmission of status messages to the first computer 22 across the physical network 26. As previously discussed, the set of instructions 248 is loaded into the allocated memory 34 of the second computer 24 and executed, as in block 104 of FIG. 4. Execution of the set of instructions 248 creates a temporary index structure 206 which stores references (e.g., a pointer) to the location in allocated memory where the code 21 0 for the Function 3 has been stored. Because the set of instructions 248 does not comprise replacement code for the Functions 1 and 2, the array members 213A and 213B of the temporary index structure 206 have zeroes stored therein to indicate the same. The set of instructions 248 next preferably executes the call 114 to the function pointer update function 50 which modifies the index structure 252 to reflect the location in allocated memory 234 where the code 210 for the Function 3 is stored, this code being executed when the call 209C to Function 3 of the server application 254 is executed. In addition, execution of the set of instructions 248 also preferably executes the code 120 for sending information to the first computer 22 across the physical network 26. Thus, it should be readily apparent that execution of the set of instructions 248 can continue and is desirable even after the replacement code or the supplemental code (e.g., code 210 for the Function 3 ) for the server application 254 has been executed. The code 120 can send such information as status or runtime diagnostic data, portions of a database, error messages or the like to the first computer 22. The set of instructions 248 can be configured to implement other processes in addition to the functionality provided by the code 120. For example, upon successful execution of the code 210 for the Function 3, the set of instructions 248 might recompile the server application 254 and write the recompiled file to a computer readable medium, or the set of instructions might initiate execution of other computer programs resident at the second computer 24.

The replacement code (e.g., 110) or supplemental code (e.g., 210) for a server function 68 which is uploaded in a set of instructions 48 from the first computer 22 can be utilized in several manners. For example, this code might simply be used to null out an original server functions 68 for diagnosis and troubleshooting. Alternatively, the code can be used to monitor one or more original server functions 68 of the server application 54 which the user of the first computer 22 has determined might be failing. The code can also be used to extract information from a database located at the second computer 24 and send it back to the first computer 22 for analysis.

As will be apparent, the above-described process for uploading and executing a set of instructions 48 having replacement code or supplemental code for one or more server functions 68 of the server application 54 at the second computer 24 can provide numerous benefits and advantages. For instance, the process can eliminate the need for an expensive on-site presence of a technician of the developer of the server application 54. Execution of the code is controlled by the developer, thereby minimizing risks of improper execution and reducing the need for or size of extraneous files, such as readme files, which must be sent to the second computer 24 from the first computer 22. The replacement code is preferably loaded into volatile memory and can therefore be destroyed or overwritten upon completion of the diagnosis process thereby reducing security concerns with respect to the uploaded set of instructions. In addition, because the original code for the server functions is preferably not overwritten, the server application 54 can be returned to its original state, if desired, upon completion of the diagnosis process.

Having shown and described the preferred embodiments of the present invention, further adaptation of the apparatuses and processes for dynamically uploading instructions to a computer made in accordance with the present invention can be accomplished by appropriate modifications by one of ordinary skill in the art without departing from the scope of the present invention. A number of alternatives and modifications have been described herein and others will be apparent to those skilled in the art. For example, the sequence of steps described herein can be changed without departing from the scope of the present invention. In addition, it is contemplated that replacement code for a server function uploaded with a set of instructions can also be placed into an original memory location if the replacement code is the same size, or less, than the original code for that function. Accordingly, the scope of the present invention should be considered in terms of the following claims and is understood not to be limited to the details of the structures and methods shown and described in the specification and drawings.

What is claimed is:

1. A process for transferring a set of instructions between a first computer system and a second computer system, said second computer system including working memory and a computer application, said computer application comprising a plurality of functions and a first index structure, each of said functions having a set of function instructions associated therewith, said first index structure storing a first reference to a first location in said working memory where each set of function instructions is stored, the process comprising the steps of:

establishing communication between the first computer system and the second computer system;

executing the function associated with the first index structure;

transferring a first set of instructions from said first computer system to said second computer system, said first set of instructions comprising a second set of instructions for interacting with said computer application;

loading said second set of instructions into said working memory of said second computer system when said computer application is in a partially executed state;

executing said first set of instructions by
      creating a second index structure at said second computer system;
      storing a second reference in said second index structure to a second location in said working memory where said second set of instructions is stored;
      replacing said first reference stored in said first index structure with said second reference stored in said second index structure;

initiating execution of said second set of instructions; and terminating execution of the function associated with the first index structure.

2. The process of claim 1, wherein the step of establishing communication further comprises the step of establishing a network connection between said first computer system and said second computer system.

3. The process of claim 2, wherein said first computer system is provided in the form of a client computer and said second computer system is provided in the form of a server computer.

4. The process of claim 1, wherein said working memory is provided in the form of random access memory.

5. The process of claim 1, wherein said first index structure is provided in the form of an array and said reference is provided in the form of a pointer.

6. The process of claim 5, further comprising the step of searching said first index structure prior to the step of executing said second set of instructions.

7. The process of claim 1, wherein the step of executing said first set of instructions further comprises the step of sending information to said first computer system.

8. The process of claim 1, wherein said second set of instructions are operative to extract information from said second computer system.

9. The process of claim 1, wherein said computer application is a database and said second set of instructions are operative to modify data stored in said database.

10. The process of claim 1, wherein said second set of instructions are operative to disable at least one of said plurality of functions.

11. The process of claim 1, wherein said second set of instructions are operative to add a new function to said plurality of functions.

12. The process of claim 1, wherein the steps are stored on a computer readable medium.

13. A computer system for transferring a set of instructions, said computer system comprising:

a first computer;

a second computer having a working memory and which is in communication with said first computer;

a computer application disposed on said second computer comprising a plurality of functions and a first index structure, each of said functions having a set of function instructions associated therewith, said set of function instructions being executable by said second computer, said first index structure storing a first reference to a first location in said working memory of said second computer where each set of function instructions is stored;

a first set of instructions adapted to be transferred between the first computer and the second computer, said first set of instructions including a second set of instructions for interacting with said computer application; and a second index structure for storing a second reference to a second location in said working memory of said second computer system where said second set of instructions is stored in response to said first set of instructions, the second reference replacing the first reference to enable execution of the second set of instructions and to terminate execution of the set of function instructions.

14. The computer system of claim 13, wherein said first index structure is provided in the form of an array and said reference is provided in the form of a pointer.

15. A method for transferring a set of instructions between a first computer and a second computer, the second computer including a memory, an operating system and an application, the application having a first index structure configured to store a first reference to a first location in the memory containing first code for a predetermined function associated with the application, the method comprising the steps of:

executing the first code associated with the application;

executing an upload function of the operating system at the second computer, the upload function allocating a second location in the memory for storing the set of instructions transferred from the first computer to the second computer;

creating a second temporary index structure at the second computer for storing a second reference associated with the allocated memory location;

replacing the first reference of the first index structure with the second reference stored in the second temporary index structure;

directing execution to the transferred set of instructions stored in the allocated memory location in response to a call to the predetermined function; and terminating execution of the first code associated with the application in response to said call to the predetermined function.

16. The method of claim 15 wherein the step of replacing comprises the step of calling a function pointer update function of the operating system to copy the second reference stored in the second temporary index structure into the first index structure.

17. The method of claim 16 further comprising the step of, wherein the transferred set of instructions comprises replacement code, loading the replacement code into the allocated memory location when the application is in a partially executed state.

18. The method of claim 17 wherein the step of directing execution to the transferred set of instructions comprises the step of executing the replacement code loaded into the allocated memory location rather than the first code stored in the first location of memory.

19. The method of claim 18 further comprising the step of transmitting a packet from the first computer to the second computer, the packet containing function code that instructs the second computer to execute the upload function of the operating system at the second computer.

20. The method of claim 19 further comprising the step of instructing the second computer to return information to the first computer within at least one of the following intervals; while the replacement code is executing and after the replacement code has executed.

21. The method of claim 20 wherein the first computer is a client computer and the second computer is a server computer, and wherein the predetermined function is a server function.

* * * * *